Patented Jan. 2, 1951

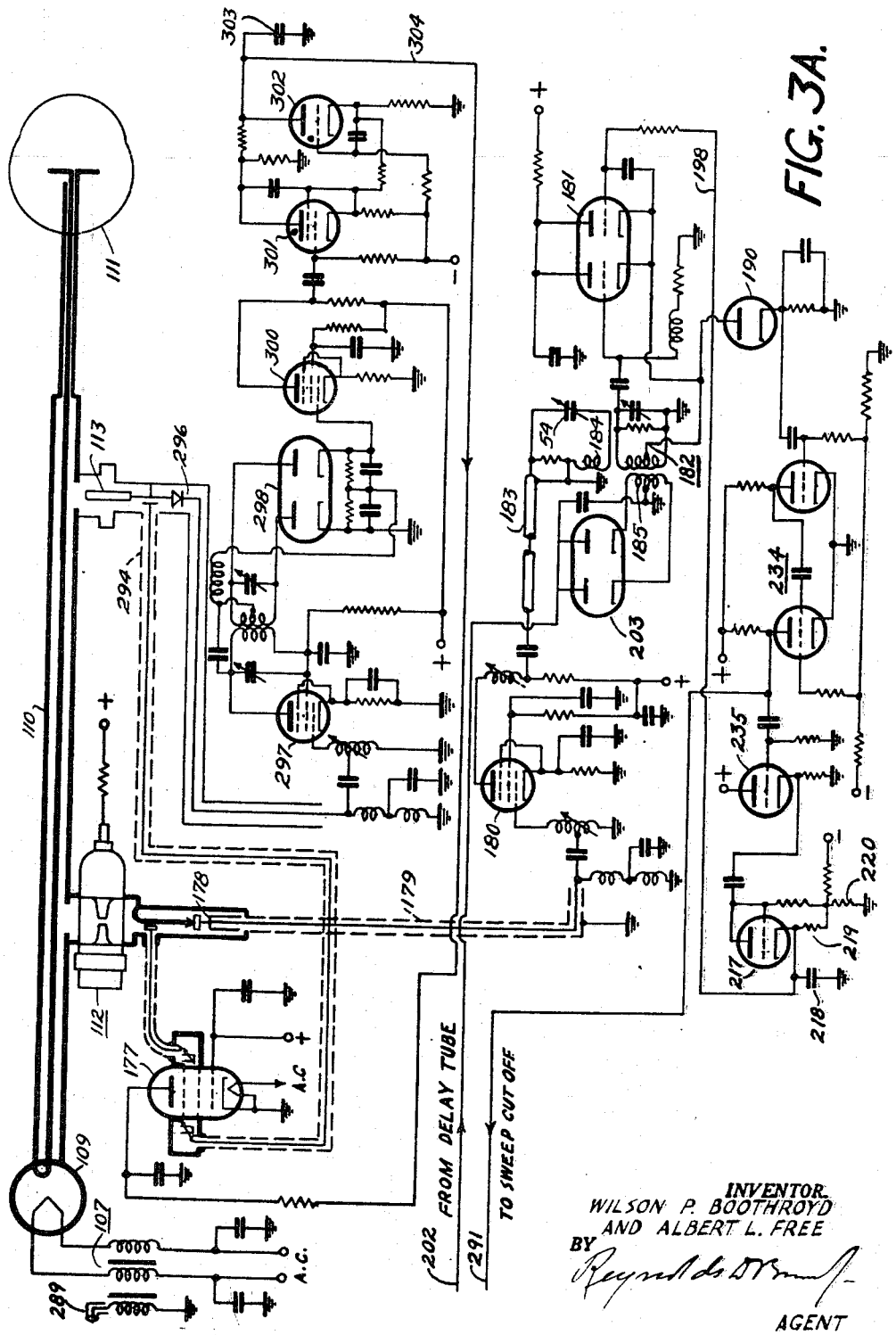

2,536,488

UNITED STATES PATENT OFFICE 2,536,488

PULSE TYPE RADIO RANGE TRACKING AND INDICATING SYSTEM CONTROLLED IN RESPONSE TO RECURRENT SIGNAL

Wilson P. Boothroyd and Albert L. Free, Philadelphia, Pa., assignors, by mesne assignments, to Philco Corporation, Philadelphia, Pa., a corporation of Pennsylvania Application March 4, 1946, Serial No. 651,888

17 Claims. (Cl. 343—13)

1

This invention relates to radio ranging systems suitable for both military and non-military application. Specifically it relates to such systems which because of their simplicity and light weight are particularly adapted for use in aircraft. In military application, systems in accordance with the invention are, for example, adapted for use in conjunction with optical gun sights to provide information regarding the range to a target optically sighted upon from a military aircraft or other vehicle in which the equipment may be located. In non-military application the systems are useful, for example, as altimeters or obstacle locators installed in commercial aircraft. They may also be used in fixed installations on the ground or in ships to determine the distance from their point of installation to any target capable of reflecting high frequency radio signals. Other applications of the systems will occur to those skilled in the art and familiar with the application of similar systems in the past.

Previously developed systems of this sort have suffered greatly from their considerable weight and bulk. This has often been due, at least in part, to the necessity for employing ranging circuits of considerable complexity if the tactical requirements of the system are to be fulfilled. These relatively complex circuits have generally included a profusion of components, many of which may be massive or bulky. In accordance with the present invention, a system is provided which is compact, light in weight, and simple in operation, while at the same time being adapted to satisfy the tactical requirements imposed by its contemplated uses. To a large extent, these advantages are derived from the use of a novel ranging and tracking circuit, for first locating a target object and for then providing continuous information as to the range of the object despite subsequent variations in this range, as described hereinafter.

The principal object of the invention is to provide a simple, light-weight, accurate radio ranging system suitable for use in both military and non-military aircraft.

Another object of the invention is to provide such a system giving a continuous range indication, once a target has been located, regardless of whether the distance from the equipment to the target is increasing or diminishing.

Another object of the invention is to provide such a system yielding range information in the form of a voltage which varies linearly with range, and is suitable for application to any one

2 of a variety of familiar electrical indicators or control devices.

Another object of the invention is to provide such a system embodying circuits which, when externally actuated, automatically control the equipment so as to cause it to search for any target within its inherent range limits and which, once the target has been located, further control the equipment so as to cause it to lock on the target and thereafter continually follow it while giving a continuous indication of target range and subsequent changes therein.

Still another object of the invention is to provide such a system employing a superregenerative receiver the sensitivity of which is automatically varied as a function of target range in order to eliminate interference with the operation of the system when ranging on targets which are relatively close to it and to provide means for discriminating against undesired nearby targets which are close to the beam of transmitted energy.

A further object of the invention is to provide such a system in which the range indicating device is automatically rendered inoperative so as to give no indication except when the equipment is locked on and following a target.

Other objects and features of the invention will become apparent from a consideration of the following description and drawings in which:

Figures 3 and 3A taken together constitute a schematic diagram illustrating an embodiment of the invention in accordance with the block diagram of Figure 1.

Figure 1:
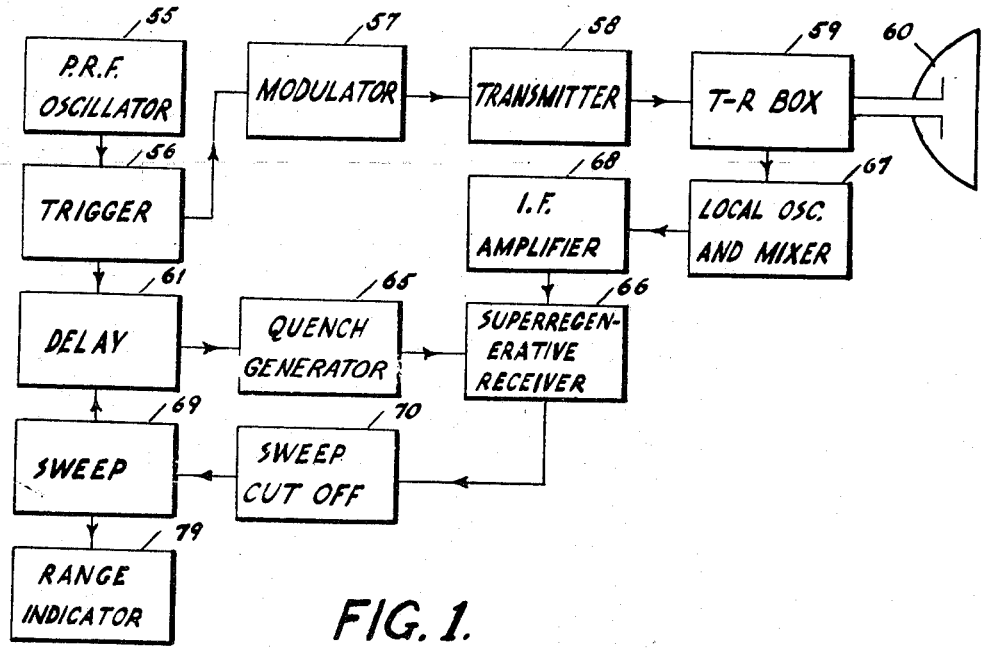
Figure 1 is a block diagram illustrating the general arrangement and features of one embodiment of the invention.

In the copending application of William E. Bradley, Serial No. 651,398, filed March 1, 1946, is described and claimed a radio ranging system of broad application, which employs a transmitter of time-spaced pulse signals, a producer of other time-spaced pulse signals, means for normally effecting a predetermined variation in the spacing between said transmitted pulses and said produced pulses, a receiver of object-reflected transmitted pulses, means responsive to the simultaneous occurrence of said received pulses and said produced pulses for interrupting said normal variation in spacing between said transmitted pulses and said produced pulses, and means for indicating the spacing between said transmitted pulses and said produced pulses upon the occurrence of said interruptions. The present invention relates to a particular novel system embodying the principles of the said Bradley application.

In accordance with the present invention, the normal variation in spacing between the transmitted and produced pulses is caused to occur cyclically in response to a control signal recurrent at a relatively low frequency compared to the frequency of transmission of time-spaced pulse signals. In response to the simultaneous occurrence of a received pulse and a produced pulse, the form of the recurrent control wave is modified so as to alter the normal variation in the delay of the produced pulses with reference to the transmitted pulses to an extent sufficient to prevent a subsequent occurrence of one of said produced pulses simultaneously with the arrival of a subsequent reflection from the same target object during a predetermined time interval and to permit such a simultaneous occurrence before it would take place in response to the normal delay. In this manner the system is caused to lock upon a particular target and to receive subsequent reflections therefrom more frequently than it would in response to the normal variation in delay of the produced pulses. At the same time the variation in delay is modified in such a manner as to take account of the fact that the target in question may be approaching the system, as a result of which a subsequent reflection may be received from the target when it is closer to the system than it was at the time when the initial reflection was received.

More particularly, in a system according to the present invention, the control signal of recurrent waveform, in response to which the cyclic variations of the produced pulses are effected, may be generated by a conventional sawtooth generator of the sort employing a condenser and a gas discharge tube. In normal operation the charge on the condenser will increase until the voltage across the condenser has reached a level sufficient to fire the gas tube. However, means are provided whereby, upon the simultaneous occurrence of a received pulse and a produced pulse, the charge on the condenser is momentarily reduced by a predetermined relatively small amount. Following this, the condenser will resume charging in the normal manner until a subsequent coincidence of a received and a produced pulse occurs and causes a repetition of the momentary discharging. Thus, in the presence of a target object, the control voltage is permitted to reach, but not to exceed, that value which produces coincidence between received and produced pulses, and varies over a small range below this maximum value. In this condition, the system is said to be locked on the target. The peak value of the control voltage may then be taken as an indication of target range, or, when the extent of the reversal of sweep operation corresponds to but a small increment of range, the average value of control voltage may be used with sufficient accuracy. When the range to the target is varying in one direction, the rapidity of the searching operation is sufficient to vary the unquench delay so as effectively to overtake the target and maintain the locked condition; when the range is varying in the opposite direction, the extent of the modification in delay produced by each pulse received during a receptive period of the receiver is sufficient to accommodate such opposite range variations. In this way, tracking of the target is achieved. The system may then be further adapted, in accordance with the invention, to provide other features desired in actual tactical operation. Thus, manually-operable devices may be provided for terminating tracking of any particular target and for reinitiating searching for either closer or more distant targets at the will of the operator. Other features of the invention, such as means for automatically controlling the sensitivity of the receiver and means for inhibiting the indication of range information when the system is searching, may also conveniently be provided as described in detail hereinafter.

The general arrangement and mode of operation of one embodiment of the invention will now be described with reference to the block diagram of Figure 1 and the wave-forms illustrated in Figure 2. Referring to Figure 1, the pulse repetition frequency (P. R. F.) oscillator 55 may comprise any suitable oscillator, such as a multivibrator, generating time-spaced pulse signals corresponding to those represented at D in Figure 2 at a frequency of, for example, 2,000 cycles per second. These pulses are supplied to a trigger circuit 56 which may comprise a differentiating circuit for producing negative pulses corresponding to the leading edges of negative pulses from the P. R. F. oscillator and positive pulses corresponding to the trailing edges thereof, as represented at E in Figure 2, and a suitable amplifier for amplifying and inverting only the positive pulses obtained by differentiation to produce negative pulses of shorter duration at the P. R. F. rate, corresponding to those shown at A in Figure 2. These shorter duration pulses are supplied through an amplifier to the modulator 57 which in turn keys the transmitter 58 to generate pulses of radio frequency energy for transmission through T-R box 59 to antenna 60 and thence into space. Transmitter 58 may be any suitable generator of microwave energy, such as a magnetron oscillator, adapted to be keyed in response to pulse signals. T-R box 59 may be of conventional form, comprising a cavity resonator and associated spark gap, adapted to permit free transmission of pulsed radio frequency energy from transmitter 58 to antenna 60, while at the same time minimizing the amount of such energy reaching local oscillator and mixer 67, thereby to prevent interference with its operation and possible destruction of the crystal usually employed therein. The negative pulses from trigger circuit 56 are also utilized to initiate the generation of pulses of variable duration in the delay circuit 61, corresponding to those represented at 62, 63 and 64 in F of Figure 2. Quench generator 65 is then responsive to the latter pulses to produce negative quench pulses whose times of inception correspond precisely to the times of occurrence of the variable trailing edges of these pulses from the delay circuit. In a representative embodiment of the invention, to be described in detail hereinafter, the quench generator may comprise a simple differentiating network for producing pulses of relatively short duration in response to the leading and trailing edges of the variable duration pulses from the delay circuit 61. As represented at G in Figure 2, the pulses thus produced in response to the trailing edges of the variable duration pulses may be of negative polarity, and, upon separation from the pulses of positive polarity produced in response to the leading edges of the variable duration pulses, may appear as represented at C in Figure 2. These pulses, which recur at the P. R. F. rate but which are delayed by varying amounts with reference to the P. R. F. oscillator pulses, are utilized to unquench the superregenerative receiver 66 at varying intervals of time after each generated pulse from the P. R. F. oscillator. Pulses of transmitted energy reflected by target objects within range of the system are intercepted by antenna 60 as in any conventional radar system. They are transmitted through T-R box 59 to a local oscillator and mixer 67 where their carrier frequency, but not their rate of occurrence, is altered and they are then amplified in intermediate frequency amplifier 68. The amplified intermediate frequency pulses are then transmitted to the input of superregenerative receiver 66 and, whenever one of them occurs simultaneously with a pulse from quench generator 65, it will be amplified and detected in the superregenerative receiver. The duration of the pulses generated by delay circuit 61 may be varied automatically, for example from 1 to 14 microseconds, at a low frequency rate of for example 10 cycles per second (the 14 microsecond duration corresponding to a maximum target range of approximately 2,300 yards and the 1 microsecond duration corresponding to the minimum workable range of the system of approximately 165 yards). The delay of the quench generator pulses will therefore vary from 1 to 14 microseconds behind successive pulses generated by the P. R. F. oscillator 55. To control this delay there is generated, in sweep circuit 69, a saw-tooth voltage recurring at a 10-cycle per second rate. This saw-tooth voltage is adapted to control the delay circuit 61 so as to vary the delay of pulses produced by it, and hence of the quench generator pulses, from 1 to 14 microseconds behind the P. R. F. oscillator pulses. When one of the quench generator pulses corresponds in time to a received pulse, the output from the superregenerative receiver 66 may be utilized to actuate a sweep cut-off circuit 70. This circuit momentarily interrupts the growth of the saw-tooth wave generated by the sweep circuit 69 during the cycle in which this occurs and furthermore may be adapted momentarily to reduce its amplitude by a predetermined amount. This amount may be made sufficient to reduce the delay of a few immediately succeeding pulses generated by delay circuit 61 to such an extent that they will occur before the arrival of target-reflected pulses at the receiver. Accordingly the growth of the saw-tooth wave will resume immediately following the simultaneous occurrence of a delayed and a received pulse and the delay of quench generator pulses will again increase until one again coincides with a received pulse, whereupon the action just described will repeat itself. The nature of the wave form generated by the sweep circuit 69, both before and after the simultaneous occurrence of a quench oscillator pulse and a received, reflected pulse, is shown at H in Figure 2. The gradual rise of the solid line 71, with reference to the broken line 72 representing zero potential, corresponds to the gradual rise of the sweep circuit voltage up to the point 73 at which the quench generator pulse 11 occurs simultaneously with the received, reflected pulse 17. In accordance with the operation of this embodiment, as will be explained in further detail hereinafter, the saw-tooth voltage may thereupon be reduced to the point 74, whereupon it will again rise along line 75 to the point 76, at which, assuming the range of the target to remain the same, a succeeding quench generator pulse 19 occurs simultaneously with a succeeding received pulse 21. In the case illustrated this will occur upon the arrival of the second received pulse following the original coincidence, although it will be apparent that, by reducing the sweep voltage by an even greater amount, the next coincidence could be made even later. This mode of operation continues so long as a target is in range. Should the target approach the equipment during the interval following the coincidence of quench pulse 11 and received pulse 17, and prior to the arrival of the next received pulse 20, this pulse would be advanced as represented at 20a and might then coincide with the next succeeding quench pulse 18. This would initiate reduction of the sweep voltage to point 77 and would be followed by the resumption of sweep voltage buildup along line 78. On the other hand, should the target recede from the equipment during the interval following coincidence, the sweep voltage would continue to build up beyond point 76 along the broken line extension of line 75 until its amplitude corresponded to the delay needed to effect coincidence. In practice sweep cut-off circuit 70 is adjusted so that, upon the simultaneous occurrence of a received pulse and a quench pulse, the voltage generated by the sweep circuit 69 will be reduced by a sufficient amount to take account of the fact that the target may approach the equipment by some predetermined amount, or at some predetermined rate, during the interval preceding the next received pulse. In other words the delay of the next succeeding qunch generator pulse is backed off sufficiently to take account of this possibility.

Inasmuch as the maximum voltage of the wave form generated by sweep circuit 69, at any time when quench generator pulses and received pulses are occurring simultaneously, will be a measure of target range, a suitable range indicator 79 responsive to this maximum voltage may be connected directly to sweep circuit 69. Alternatively, of course, separate conventional circuits may be employed to measure the delay between successive P. R. F. and quench pulses.

It is significant and a feature of the invention that the range voltage thus derived depends solely upon the delay, with respect to transmitted pulses, of unquenching pulses which coincide with received target pulses. Contrary to the situation existing in a number of prior art systems, it is not required to maintain the shape of received target signals through a plurality of stages of intermediate frequency amplification. In the present system, such amplification is reduced to a minimum by the specialized application of a superregenerative receiver, and thereby this major source of error is eliminated.

A detailed explanation will now be given of the circuits which might be used to achieve the embodiment of the invention in accordance with the general showing of the block diagram of Figure 1. These circuits are shown in the schematic diagram of Figures 3 and 3A. In this diagram the pulse repetition frequency oscillator 55 of Figure 1 may be a cathode feedback multivibrator oscillator comprising triodes 96 and 97 together with their associated connections. This oscillator may be adapted to oscillate at a frequency of approximately 2,000 cycles per second as adjusted by the variable resistor 98. Its circuits should be designed for maximum frequency stability and to give a suitable rectangular wave shape. Although its frequency may vary somewhat this will not affect the operation of the other circuits in accordance with the invention. The negative pulse derived from the plate of tube 97 is supplied through a differentiating circuit comprising condenser 99 and resistor 100 to the grid of a trigger tube 136, the output of which will be a pulse corresponding to the trailing edge of the negative pulse derived from the plate of tube 97. This pulse is fed from the plate of tube 136 to the grid of a trigger amplifier tube 101 and thence to the grid of a cathode follower tube 221, from the cathode load 222 of which a corresponding pulse is supplied to the grid of modulator tube 236, which may be a type 3C45 gas tube. The cathode follower tube 221 is used to provide a low impedance drive for the gas tube modulator to avoid variations in the time of its triggering. In the output circuit of the modulator tube 236 is connected a resonant charging choke 105 tuned by the capacitors of delay line 106 which may have a characteristic impedance of approximately 50 ohms and whose input is connected to the plate of the modulator tube in the manner shown. A modulating pulse which may be of the order of 2,200 volts is developed across resonant choke 105 and is supplied, through delay line 106 for shaping purposes, to the primary winding of pulse transformer 107. Included in this connection may be a transmission line 289 having a characteristic impedance of approximately 50 ohms, since in practice magnetron 109, to which the secondary of the pulse transformer 107 is connected, will be located in a separate pressurized unit from the circuits heretofore described. Magnetron 109 may be a type 2J39 tube operating in S band with a peak power output of approximately five kilowatts. Pulsed microwave energy from magnetron 109 may be supplied through a section of stub-supported coaxial transmission line 110 to a suitable radiating and receiving antenna 111. At suitable points along line 110 may be located T-R cavity 112 and capacity probe 113 for signal take-off, the exact functions of which will be explained in further detail hereinafter.

Negative pulse signals at the pulse repetition frequency of 2,000 cycles per second are also supplied from the plate of trigger tube 136 to the plate of tube 204, which together with tube 205 and associated connections comprises a cathode feed-back, non-oscillatory multivibrator 199. The function of this multivibrator is to generate positive pulses of varying duration whose leading edges correspond to the trailing edges of negative pulses generated by the P. R. F. oscillator. Its mode of operation is generally as follows: The grid of tube 205 is normally biased more positive than the grid of tube 204 so as to cause tube 205 normally to conduct. It should be noted, however, that the bias on tube 205 is determined not only by the potential applied to its grid but also by the drop in the cathode resistor 209 during the time the tube is conducting. Tube 204, on the other hand, is normally cut off. Upon the occurrence of a negative pulse supplied to its through connection 114 from the plate of tube 136, the grid of tube 205 will be driven sufficiently negative to cut off the tube. When this happens the cathode of tube 204 as well as the cathode of tube 205 will be reduced to ground potential and tube 204 will begin to conduct. The current drawn by tube 204 will of course depend upon the bias applied to its grid from potentiometer 238. As tube 204 begins to conduct its plate will go negative and apply a negative impulse to the grid of tube 205 to maintain it cut off. However, this effect will gradually be overcome, as condenser 207 charges through tube 204, until a point is reached at which tube 205 again conducts. The circuit is then in condition to repeat its cycle in response to the next pulse supplied from the trigger tube. The duration of pulses generated by this delay multivibrator will be variable, depending upon the grid bias on tube 204, from 1 to 14 microseconds. From these varying width delay pulses a differentiated signal is derived across the resistor 201 of a differentiating circuit comprising this resistor and condenser 200, and the negative pulses, corresponding to the trailing edges of the variable width pulses from the delay multivibrator, are applied through connection 202 to unquench a superregenerative receiver whose circuits and mode of operation will be described in further detail hereinafter.

The widths of pulses generated by the delay multivibrator 199 are determined by the voltage applied to the grid of tube 204 through cathode follower tube 237 and voltage divider 238 from sweep tube 213. The latter may consist of a type 2D21 gas tube, between the plate of which and ground is connected a condenser 216. The other constants of this circuit are adjusted so that the sweep tube will normally develop across condenser 216 a saw-tooth voltage having a recurrence frequency of approximately 10 cycles per second. This voltage, supplied through cathode follower 237, causes the potential on the grid of tube 204 of the delay multivibrator to vary, thereby varying the duration of the pulses generated by the delay multivibrator from 1 to 14 microseconds 10 times per second. In the absence of any received, reflected signal, the sweep tube 213 will cause the delay multivibrator continually to sweep through the range of pulse widths from 1 to 14 microseconds, corresponding to ranges of from 165 to 2300 yards. However a sweep cut-off tube 214, which may also be a type 2D21 gas tube, is connected in shunt with condenser 216 and is supplied through connection 291 with pulses from the superregenerative receiver output, corresponding to received, target-reflected signals, to discharge the condenser 216 by a predetermined amount determined by resistor 215 whenever such a pulse is received. As has already been mentioned in connection with the description of the block diagram of Figure 1, the amount by which the condenser 216 is discharged by such a pulse is made such that the voltage to which the grid of tube 204 of the delay multivibrator is reduced corresponds to a delay somewhat less than the time actually required for the preceding reflected signal to be received from the target. As was explained this is to take account of any diminution of the distance from the equipment to the target. There may also be provided an outswitch 139, connected between the grid of tube 214 and ground, which, when momentarily closed, will prevent a given received signal from actuating the sweep cut-off tube, thereby permitting the sweep voltage to continue rising, the width of the delay pulse to increase further, and the system to search for and ultimately lock on a more distant target. A range signal proportional to the peak voltage across condenser 216 may be derived directly from divider 239 and supplied through connection 240 to a suitable range indicator 295.

Figure 2:
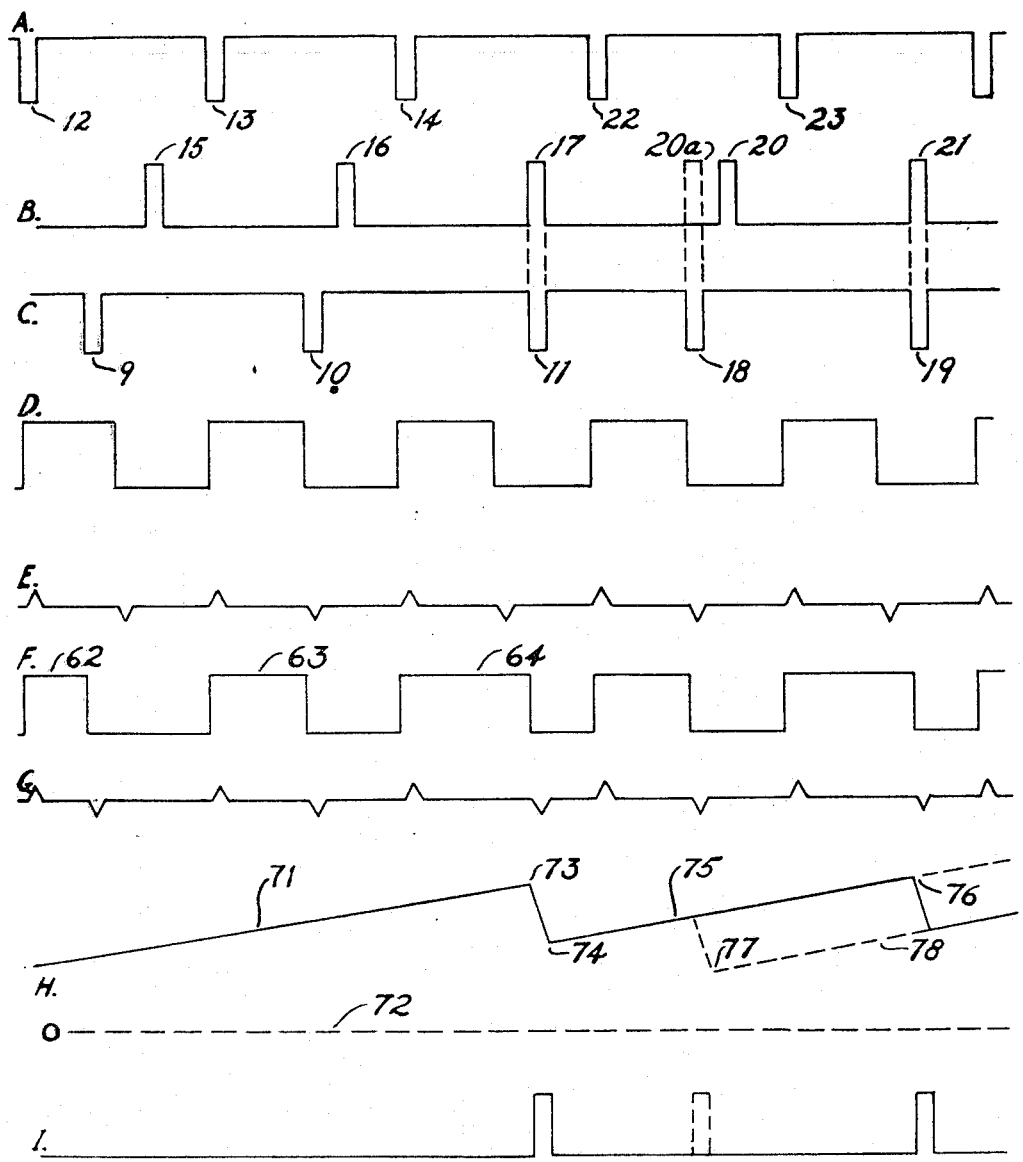
Figure 2 illustrates wave-forms existing at various points in the block diagram of Figure 1 and in the schematic diagrams of an embodiment of the invention illustrated in Figures 3 and 3A.

Although specific reference has not been made in the preceding description to the wave forms shown in Figure 2, in view of the fact that such reference was made in the description of the block diagram of Figure 1, it is felt that it will now be helpful to point these out. At D of Figure 2 is shown a rectangular wave of the sort which may be generated by the P. R. F. oscillator. It should be understood however that although positive and negative pulses have for convenience been shown to be of equal duration, this is not necessarily and in fact is not actually the case in the embodiment just described. At E is shown a signal, with negative and positive pulses corresponding respectively to the leading and trailing edges of the negative pulses in D, such as might appear on the grid of the trigger amplifier 136. At A are shown negative pulses, corresponding to the positive pulses of E, which might appear on the plate of trigger tube 136. At F are shown pulses of varying duration 62, 63 and 64 corresponding to those generated by the delay multivibrator and appearing at the plate of tube 205. At G are shown positive and negative pulses, corresponding respectively to the leading and trailing edges of the pulses at F, which would appear on connection 202. At C are shown pulses 9, 10 and 11, variably delayed with respect to modulator pulses 12, 13 and 14, which correspond to the negative pulses in G and control unquenching of the superregenerator. At H is shown the wave form which might appear across condenser 216 of the sweep circuit before as well as after the reception of a target reflected pulse, and at I are shown pulses corresponding to the output of the superregenerative receiver which would be applied through connection 291 to the grid of sweep cut-off tube 214.

Referring again to the schematic diagram of Figures 3 and 3A there will now be explained in detail the operation of the superregenerative receiver, shown generally at 66 in the block diagram of Figure 1, and its associated circuits. Received, target-reflected signals derived from T-R box 112 are mixed with a signal from local oscillator 177 in crystal mixer 178 and the resulting intermediate frequency is supplied therefrom through transmission line 179 to the input of buffer preamplifier tube 180. It is to be noted that the primary function of this tube is to prevent radiation through the antenna 111 of signal from the superregenerator and that, except for this requirement in certain military applications, the tube might be omitted inasmuch as sufficient amplification is provided by the superregenerator alone. In order accurately to maintain the frequency of the local oscillator 177, which may comprise a type 2K28 klystron, an automatic frequency control circuit is employed. To this end, received signals derived from another point on transmission line 110 by means of capacity probe 113 are mixed in crystal mixer 296 with local oscillator signal supplied through connection 294. The resulting signal is amplified in a suitable intermediate frequency amplifier 297 and supplied to a conventional discriminator comprising tube 298 and associated circuits.

From the output of the discriminator are derived positive or negative pulses, the polarity of which will depend upon the relation between the transmitter and local oscillator frequencies as compared to the intermediate frequency tuning of the discriminator. These pulses are amplified in the pulse amplifier tube 300 and are supplied from the output thereof to the grid of a gas discharge tube 301. The latter is connected in shunt with a second gas discharge tube 302 which, together with condenser 303, constitutes a sawtooth oscillator which may be adjusted to operate at a low frequency of, for example, 5 cycles per second. The voltage developed across condenser 303 is supplied through connection 304 to the repeller of local oscillator tube 177 to vary its frequency through a range comprising those frequencies which, when mixed with frequencies within the range at which the transmitter might operate, will yield the desired intermediate frequency. Thus the gas tube oscillator will tend to sweep the frequency of the local oscillator 177 through this range 5 times per second. However the positive pulses from the pulse amplifier 300, appearing on the grid of tube 301, will cause it to conduct whenever the frequency of the transmitter exceeds the frequency to which the discriminator is tuned. This will discharge condenser 303 by a certain amount so as to tend to maintain the voltage thereacross, and hence the frequency of local oscillator 177, constant.

The left hand triode section of tube 181, together with tank circuit 182, comprise a superregenerative oscillator which may be adjusted to operate at a frequency in the neighborhood of 60 megacycles. Pulses of intermediate frequency energy corresponding to target signals will be supplied to tank circuit 182 through connection 183 and an inductor 184 coupled to the tank circuit inductance. Unquenching pulses at the quench generator rate of 2 kilocycles, and variably delayed with respect to transmittted pulses from the P. R. F. oscillator, will also be supplied through connection 202 to a damping circuit comprising double diode 203 and inductor 185 coupled to the inductor of tank circuit 182. In the presence of received signals oscillations in the tank circuit 182 will build up more rapidly, and to a higher level during the unquench interval, than in their absence. The rate of buildup of oscillations may be adjusted so that, in the absence of received signal, they will not build up during the unquench interval beyond a predetermined level, while, in the presence of received signal, they will build up appreciably beyond this predetermined level. This adjustment is conveniently made by adjustment of the coupling between inductor 184 and the inductor of tank circuit 182 and by adjustment of the tuning of the circuit comprising inductor 184 and condenser 54 to differ somewhat from the resonant frequency of tank circuit 182. It will be apparent also that the duration of the unquench interval is an important factor in controlling the difference between the output of the superregenerator in the presence and in the absence of received signal. As already mentioned the duration of this interval is readily controlled by differentiating or otherwise narrowing the pulses generated by the delay. To distinguish between the output of the superregenerator with and without received signals, there was utilized, in this embodiment of the invention, an integrating device comprising diode 190 and its associated cathode load. Upon the arrival of a reflected pulse simultaneously with the unquenching of the superregenerator, this integrator operates to produce at the cathode of tube 199, pulses of voltage which are substantially greater than those produced in the absence of received signal. These are amplified in a pulse amplifier 234 and the output is supplied through connection 291 to the grid of sweep cut-off tube 214 to cause this tube to conduct whenever a target signal is received as hereinbefore explained.

To maintain the sensitivity of the superregenerative receiver at an optimum value, it is desirable to employ a form of automatic regeneration control which operates in response to the output of the superregenerator in the absense of received signal in a manner more fully discussed in copending application of Albert L. Free entitled Automatic Regeneration Control for Pulse-Echo System, Serial No. 652,320, filed March 6, 1946, now Patent No. 2,476,409, granted July 19, 1949. This type of control is achieved in the present embodiment by adjusting the low frequency sweep oscillator, consisting of gas tube 213 and condenser 216, so that upon the reception of a target signal the sweep voltage developed across condenser 216 will be reduced by an amount sufficient to prevent a substantial number of immediately succeeding target signals from being amplified by the superregenerator. For example, in this embodiment, cut-off tube 214, which discharges condenser 216 by a predetermined amount in response to a received and amplified target signal applied to its grid, may be a type 2D21 gas tube, condenser 216 may have a capacitance of 0.5 microfarad, resistor 215 a value of 1.5 megohms, resistor 231 a value of 82,000 ohms, resistor 232 a value of 2,200 ohms, resistor 233 a value of 180,000 ohms, and the negative bias voltage applied to the control grid of tube 214 through resistor 233 may be 150 volts. These constants will be such as to permit amplification by the superregenerator of but one in every five target-reflected pulses. To permit this mode of operation it will also be desirable to adjust the time constant of the automatic regeneration control circuit. In the embodiment shown in these figures the automatic regeneration control voltage is derived from triode 217, which is supplied with amplified target pulses from pulse amplifier 234 through a cathode follower tube 235. Triode 217 is connected as a diode, and, together with cathode resistors 219 and 220 and condenser 218, comprises a peak detector for integrating successive pulses from the pulse amplifier. The output signal from the cathode of triode 217 is supplied, through connection 198 and an R.-C. smoothing filter, to the grid of the right-hand triode section of tube 181 whose plate is connected to the plate of the superregenerator triode. The polarity of signals is then such that a tendency for the pulses produced by the superregenerator to increase in the absence of received signal will increase the level of the integrated voltage applied to the grid of the other triode section, and thus reduce the plate voltage supplied to the superregenerator. In this way, the tendency for the superregenerator to produce greater output signals is counteracted, and the sensitivity of the superregenerator may be maintained essentially constant. The time constant of the automatic regeneration control circuit will be determined by the magnitudes of condenser 218, resistor 219 and resistor 220, which may be as follows:

Condenser 218 _____ 1,000 mm.-farads
Resistor 219 _____ 1 megohm
Resistor 220 _____ 2,700 ohms These values will give a time constant equal to 1,000 microseconds or approximately two-fifths of the time interval between every 5th target-reflected pulse. This time constant will be such as to permit the automatic regeneration control voltage to fall from a level corresponding to the presence of a received signal to the no-signal level between every 5th target-reflected pulse, and since the intermediate target-reflected pulses will not be amplified by the superregenerator, they will not affect the operation of the automatic regeneration control. The superregenerative receiver may be designed so as to limit the peaks of received signals exceeding a given level, so that, at the discharge rate prescribed by the circuit constants of the automatic regeneration control circuit, the return to no-signal level of the automatic regeneration control voltage will be assured. Thus strong signals from nearby targets will be prevented from adversely affecting the sensitivity of the superregenerator. There will of course be no difficulty in connection with signals from more distant targets as they will be weaker and will not affect the automatic regeneration control circuits to as great an extent as the larger signals from closer targets.

Alternatively, the desired operation of the automatic regeneration control in this embodiment might be achieved by interrupting the operation of the transmitter in response to the simultaneous arrival of a target-reflected pulse and the unquenching of the superregenerator. This interruption may be made of sufficient duration to eliminate any received signal during a certain number of unquenched intervals of the superregenerator immediately following the simultaneous arrival of a target-reflected pulse and the unquenching of the receiver. In the schematic of Figures 3 and 3A this might be achieved by deriving a pulse from tank circuit 182 of the superregenerator, broadening it by the desired amount and applying it to the modulator amplifier tube 221 or modulator tube 236 to prevent keying of the transmitting magnetron during the desired interval.

Further, in a radio ranging system such as the one in accordance with the present invention, it will be desirable to vary the sensitivity of the receiver circuits in such a way as to provide relatively low sensitivity for nearby targets and appreciably greater sensitivity for more distant targets. This is desirable in order to eliminate the effects of interference which may exist for nearby targets owing to the time proximity of transmitted and received pulses, as well as the existence of spurious signals generated by the transmitter. It is permissible because of the fact that signals from nearby targets are appreciably greater in amplitude than those from more distant targets and hence require less sensitivity for satisfactory reception. In the present embodiment of the invention, the sensitivity of the superregenerator can readily be varied by varying the amplitude and/or steepness of the unquenching pulses applied thereto. This steepness or amplitude should be varied so as to increase throughout each cycle of the sweep tube and may to some extent be achieved by designing delay multivibrator 199 in such a way that the steepness of the trailing edge of the delay pulse will increase in proportion to its width. Hence when the trailing edge of the delay pulse is differentiated, a pulse will be obtained whose amplitude and steepness is proportional to the width of the pulse. In the present embodiment, to yield this result tubes 204 and 205 of the delay multivibrator comprise the two sections of a double triode, type 6J6, and the constants of the delay multivibrator circuit are as follows:

| | |
|---|---|
| Resistor 206 | 20,000 ohms |
| Condenser 207 | 150 mm.-farads |
| Resistor 208 | 1 megohm |
| Resistor 209 | 2,200 ohms |
| Resistor 210 | 4,700 ohms |
| Resistor 211 | 3,900 ohms |
| Condenser 212 | 0.01 microfarad |

However in general the amount of variation in sensitivity which can be obtained in the manner just described will be insufficient to yield the best results and it will be desirable to provide further means for controlling the sensitivity of the superregenerator. Another method of doing this, shown in the schematic of Figures 3 and 3A is to derive across an R.-C. circuit, comprising resistor 222 and condenser 223 in the cathode circuit of modulator amplifier tube 221, a shaped pulse corresponding to each P. R. F. pulse and of the general form shown at 227. However it should be noted that the shape of the pulse shown at 227 has been modified by the omission of a large positive excursion at its peak. This corresponds to the pulse from the trigger tube which keys the modulator 236 and has been omitted for convenience in illustration since it does not affect the operation of the automatic sensitivity control circuits. The duration of this pulse is preferably made somewhat less than the time interval corresponding to the maximum range of target on which the system is to operate and should decrease in instantaneous amplitude from a time in each sweep cycle corresponding to minimum range to a time later in the sweep cycle corresponding to somewhat less than maximum range. It may be supplied through resistor 224 to connection 202 which normally supplies unquenching pulses from delay multivibrator 199 to quench tube 203. Resistor 224 in conjunction with resistor 201 serves to divide the integrated pulse down to the proper amplitude, and resistor 224 also serves to isolate shaping network 222, 223 from differentiating network 200, 201. The shaped pulses from the cathode circuit of tube 221, when combined with unquenching pulses also developed across resistor 201 and corresponding to those shown at 228, will yield a wave-form resembling that shown at 229. Quench tube 203, to which this is applied, will conduct during the intervals of positive potential and introduce damping into the tank circuit 182 of the superregenerator to inhibit oscillations therein. However during the intervals corresponding to the negative portions 230 of waveform 229, the superregenerator will be unquenched so as to permit oscillations to build up. Both the durations and amplitudes of these pulses increase throughout the sweep cycle and both will tend to increase the sensitivity of the superregenerator, the duration affecting the extent, and the amplitude, the rate of buildup of oscillations therein.

Alternatively shaped pulses of duration corresponding roughly to that of the sweep cycle may be derived from an R.-C. circuit in the cathode circuit of sweep tube 213. Such pulses could be combined with variably delayed quenching pulses in the manner just described to yield pulses of varying duration and amplitude for controlled quenching. The R.-C. circuit in the cathode circuit of the sweep tube would be required to have a much greater time constant than in the arrangement described in the previous paragraph (approximately 0.2 second in the present embodiment) which, in this instance, makes its use somewhat less desirable.

In the arrangement for securing automatic sensitivity control shown in Figures 3 and 3A, the modulator amplifier tube 221 from which the integrated pulse was derived comprised the two sections of type 6J6 double triode and the constants of the circuit were as follows:

| | |
|---|---|
| Resistor 222 | 4,700 ohms |
| Condenser 223 | 150 mm.-farads |
| Resistor 224 | 18,000 ohms |
| Resistor 201 | 4,700 ohms |
| Resistor 225 | 470,000 ohms |
| Condenser 226 | 1,000 mm.-farads |

It may be pointed out that in this arrangement it will be desirable that condenser 226 be small so that the low impedance from grid to ground caused by firing of modulator tube 236 will not impair the operation of the integrating network 222, 223.

Figure 3:
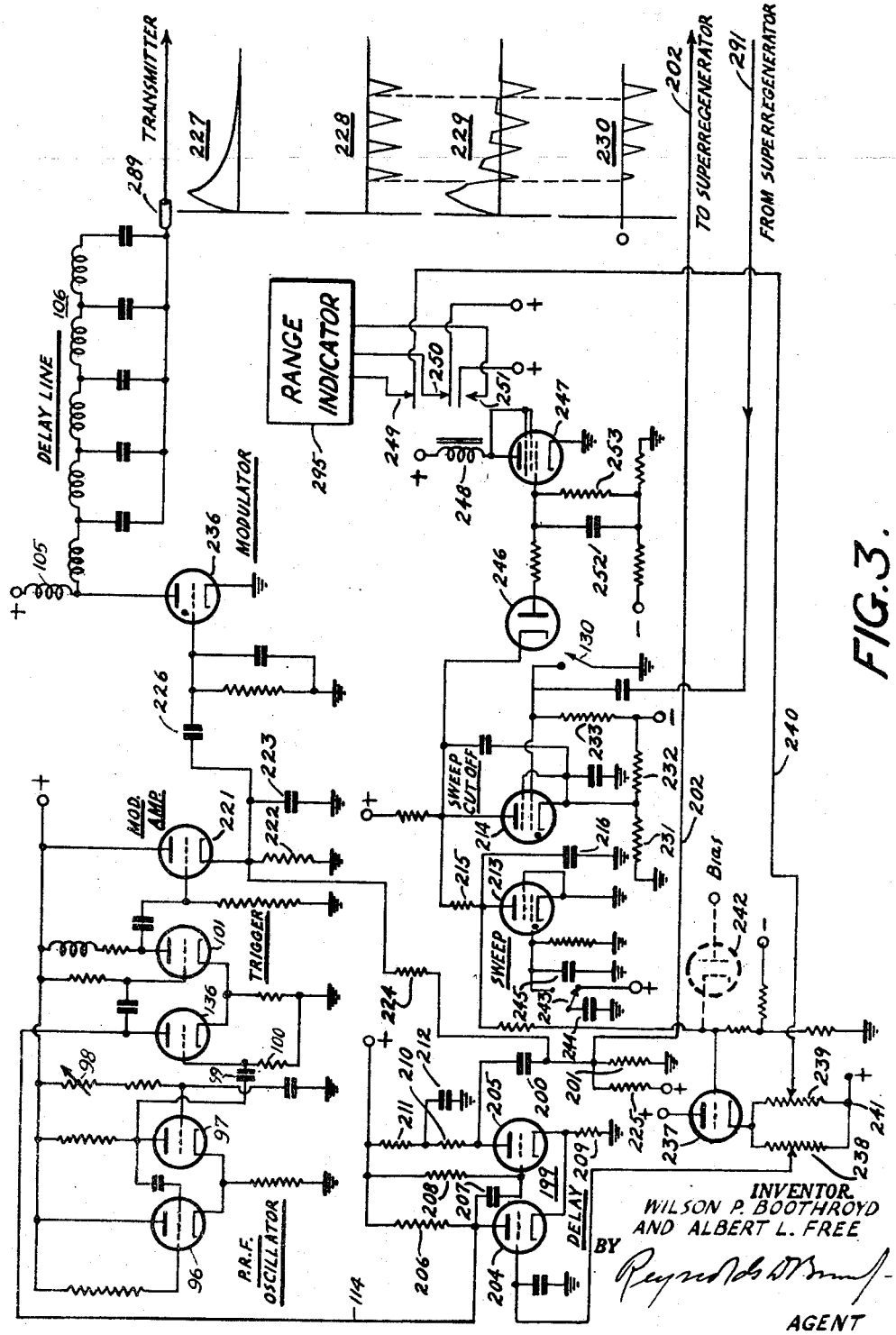

Another feature of the embodiment of the invention shown in Figures 3 and 3A is the provision of a cathode follower tube 237 for direct-coupling the output of the sweep tube 213 to the grid of tube 204 of the delay multivibrator 199. Sweep voltage from the plate of tube 213 is applied to the grid of tube 237 and the output to tube 204 is derived from potentiometer 238 in the cathode circuit. An output voltage proportional to range may also be derived from a second potentiometer 239 likewise connected in the cathode circuit of tube 237. The use of this arrangement also permits the introduction of another extremely useful feature. By connecting the lower end 241 of the cathode load, comprising potentiometers 238 and 239, to a source of positive potential the sweep voltage may be prevented from falling below some predetermined potential corresponding to minimum range. This will prevent jamming of the system by a strong continuous wave signal impressed on the receiver circuits, which would normally cause the sweep tube to fire continually, the sweep voltage to fall below the potential corresponding to minimum range and the width of the delay pulse to be reduced to such an extent as to permit the receiver to pick up its own transmitted signal. This feature can also be used to prevent the system from locking on targets closer than a predetermined minimum range, such, for example, as other friendly aircraft in a formation. Alternatively the same result might be achieved by connecting the cathode of a diode 242 to the grid of tube 237 and connecting its plate to a suitable source of positive bias. The same result would be achieved but an additional tube would be required.

Sweep tube 213 may also be provided in this embodiment with a special form of in-switch to permit reducing the sweep voltage to zero in order to select a new target at a shorter range. This switching arrangement comprises a switch 243 normally connecting condenser 244 to a source of positive potential. When it is desired to re-initiate the sweep, switch 243 is thrown to its other position, connecting condenser 244 to the grid of sweep tube 213. The voltage developed across the condenser 244 will cause tube 213 to conduct heavily enough to reduce the sweep voltage to that corresponding to the minimum range of the system. The charge on condenser 244 will be quickly lost and the sweep voltage will start again in its normal manner. Condenser 245 is used to damp out the spark resulting when switch 243 is thrown. Condensers 244 and 245 in this arrangement may each have capacitances of 600 mm.-farads.

Still another feature of this embodiment is provision of means for rendering range indicator 295 inoperative in the absence of a received target signal so that no indication will be given by it under these circumstances. The signal for actuating such a device can conveniently be derived from sweep cut-off tube 214 which draws current only in the presence of a received target signal. Because of the high load impedance in the plate circuit of this tube it can not be used as a source of power. Hence a peak detector comprising diode 246 and a high time constant load impedance consisting of condenser 252 and resistor 253 may be connected to the plate of tube 214. The output of this peak detector is supplied to the grid of tube 247, in the plate circuit of which is connected coil 248 of a relay. It is noted that the normal, i. e. de-energized, condition of the relay is produced by the cutting off of plate current in tube 247 in response to received signals, and therefore corresponds to the abnormal condition of the complete radio ranging system which exists when normal searching is interrupted by signal reception. Contacts 249 and 250 of this relay are normally closed, connecting the range output voltage to a suitable range indicator 295 and supplying this range indicator with a suitable voltage to render it operative. Contact 251 is normally open but will be closed in the absence of a target signal to apply to the range indicator a suitable voltage for rendering it inoperative. At the same time contacts 249 and 250 will be opened so as to remove the range output signal and the normal operating voltage from the range indicator.

Subject matter shown and described in this specification but not claimed herein is claimed in copending applications assigned to the assignee of the present invention as follows:

The following subject matter, in copending application of William E. Bradley, Serial Number 651,398, filed March 1, 1946:

(1) A radio ranging system employing a transmitter of time-spaced pulse signals, a producer of other time-spaced pulse signals, means for normally effecting a predetermined variation in the spacing between said transmitted pulses and said produced pulses, a receiver of object-reflected transmitted pulses, and means responsive to the simultaneous occurrence of received and produced pulses for interrupting said normal variation in spacing between said transmitted pulses and said produced pulses, and means for indicating the spacing between said transmitted pulses and said produced pulses upon the occurrence of said interruptions.

The following subject matter in copending application of Kenneth H. Emerson, Serial Number 651,649, filed March 2, 1946:

(1) A system comprising a super-regenerative receiver of time-spaced pulse-modulated carrier wave signals, means for unquenching said receiver during time-spaced intervals, at least some of said intervals coinciding with the arrival of received pulses, and means for controlling the sensitivity of said receiver in response to its output in the absence of received signals.

The following subject matter in copending application of Albert L. Free, Serial Number 652,320, filed March 6, 1946, now Patent No. 2,476,409, granted July 19, 1949:

(1) A radio ranging system employing a transmitter of time-spaced pulse signals at a particular frequency, a producer of other time-spaced pulse signals at substantially the frequency of said transmitter pulses, and means for variably delaying said pulses with respect to said transmitted pulses, a superregenerative receiver of object-reflected transmitted pulses and means for unquenching said receiver in response to said delayed pulses, means responsive to the simultaneous occurrence of received and delayed pulses for modifying the delay of immediately succeeding produced pulses to insure their nonoccurrence simultaneously with received pulses, and means utilizing the output of said receiver during the non-occurrence simultaneously of produced and received pulses to control its sensitivity.

(2) The representative embodiment of such a system described with reference to Figures 3 and 3A of this specification.

The following subject matter in copending application of Albert L. Free and de Bremond B. Hoffman, Serial Number 657,404, filed March 27, 1946:

(1) In a radio ranging system of the general sort described, employing a superregenerative receiver of object-reflected transmitted pulses adapted to be unquenched in response to pulse signals supplied to it and having its sensitivity determined by the character of said pulses, and a producer of other time-spaced pulse signals normally delayed by varying time intervals with reference to said transmitter pulses, the method of and means for controlling the sensitivity of said receiver by modifying the character of said produced pulses as a function of their delay and applying them to the receiver to unquench it and control its sensitivity.

(2) The means for achieving this result shown and described with reference to Figures 3 and 3A of this specification.

The following subject matter in copending application of William E. Bradley, Serial Number 660,037, filed April 6, 1946:

(1) The quenching circuit for a superregenerative receiver, comprising a pair of diodes oppositely connected and coupled to the tank circuit of a superregenerative receiver, as shown and described with reference to Figures 3A of this specification.

We claim:

1. In a radio ranging system, a transmitter of time-spaced pulse signals at a particular frequency, a receiver of object-reflected transmitted pulses, means responsive to a recurrent waveform of lower frequency than said transmitted signals for variably delaying pulses from said transmitter by amounts proportional to the instantaneous amplitude of said waveform, means for generating said recurrent waveform and for supplying it to said delay means, means responsive to the simultaneous occurrence of delayed and received pulses for limiting the peak amplitude of said recurrent waveform supplied to said delay means, and means for deriving an output which is a function of the peak amplitude of said waveform.

2. In a radio ranging system, a transmitter of time-spaced pulse signals at a particular frequency, a receiver of object-reflected transmitted pulses, means for variably delaying pulses from said transmitter by time intervals proportional to the instantaneous amplitude of a sawtooth waveform of frequency lower than said transmitted signals, means comprising a condenser and a gas discharge tube for generating said sawtooth waveform and for applying it to said delay means, means responsive to the simultaneous occurrence of delayed and received pulses for discharging said condenser by a predetermined amount, and means for deriving an output which is a function of the peak amplitude of said sawtooth waveform.

3. In a radio ranging system, a transmitter of time-spaced pulse signals, a producer of other time-spaced pulse signals normally delayed by varying time intervals with reference to said transmitted pulses, and means for differentiating said delayed pulses to yield narrower and steeper pulses, a superregenerative receiver of object-reflected transmitted pulses and means for unquenching said receiver in response to said differentiated delayed pulses, means responsive to the simultaneous arrival of received pulses and unquenching of said receiver for substantially altering the variation in the delay of said delayed pulses with reference to transmitted pulses, and a means for deriving an output which is a function of the delay between successive transmitter and producer pulses.

4. In a radio ranging system, a transmitter of time-spaced pulse signals at a particular frequency, a receiver of object-reflected transmitted pulses, means for variably delaying pulses from said transmitter by time intervals proportional to the instantaneous amplitude of a sawtooth waveform of frequency lower than said transmitted signals, means comprising a condenser and a gas discharge tube for generating said sawtooth waveform, a vacuum tube having at least triode elements, having a load impedance connected in its cathode circuit and having its grid connected to said sawtooth generator, a connection from said cathode load impedance to said delay means for controlling the delay produced thereby, means responsive to the simultaneous occurrence of delayed and received pulses for discharging said condenser by a predetermined amount, and means for deriving an output which is a function of the peak current in said cathode load impedance.

5. In a radio ranging system, a transmitter of time-spaced pulse signals at a particular frequency, a receiver of object-reflected transmitted pulses, means responsive to a recurrent waveform of lower frequency than said transmitted signals for variably delaying pulses from said transmitter by amounts proportional to the instantaneous amplitude of said waveform, a generator of said recurrent waveform, a vacuum tube having at least triode elements, having a load impedance connected in its cathode circuit and having its grid connected to said generator, a connection from said cathode load impedance to said delay means for controlling the delay produced thereby, means responsive to the simultaneous occurrence of delayed and received pulses for limiting the peak amplitude of said recurrent waveform supplied to said delay means, and means for deriving an output which is a function of the peak current in said cathode load impedance.

6. In a radio ranging system, a transmitter of time-spaced pulse signals, a producer of other time-spaced pulse signals normally delayed by varying time intervals with reference to said transmitter pulses, a superregenerative receiver of object-reflected transmitted pulses and means for unquenching said receiver in response to said delayed pulses, means for varying the sensitivity of said receiver as a function of the delay of said delayed pulses, and means for deriving an output which is a function of the delay of a received pulse arriving simultaneously with the unquenching of said receiver with respect to the transmitter pulse of which it is the reflection.

7. In a radio ranging system, a transmitter of time-spaced pulse signals at a particular frequency, a receiver of object-reflected transmitted pulses, means responsive to a recurrent waveform of lower frequency than said transmitted signals for variably delaying pulses from said transmitter by amounts proportional to the instantaneous amplitude of said waveform, a generator of said recurrent waveform, a vacuum tube having at least triode elements, having a load impedance connected in its cathode circuit and having its grid connected to said generator and also through a diode to a source of suitable bias to limit the peaks of said recurrent waveform of sense corresponding to minimum delay, a connection from said cathode load impedance to said delay means for controlling the delay produced thereby, means responsive to the simultaneous occurrence of delayed and received pulses for limiting the peak amplitude of said recurrent waveform supplied to said delay means, and a means for deriving an output which is a function of the peak current in said cathode load impedance.

8. In a radio ranging system, a transmitter of time-spaced pulse signals at a particular frequency, a receiver of object-reflected transmitted pulses, means responsive to a recurrent waveform of lower frequency than said transmitted signals for variably delaying pulses from said transmitter by amounts proportional to the instantaneous amplitude of said waveform, a generator of said recurrent waveform, a vacuum tube having at least triode elements, having its grid connected to said generator and having its cathode connected through a load impedance to a source of suitable bias to limit the peaks of said recurrent waveform of sense corresponding to minimum delay, a connection from said cathode load impedance to said delay means for controlling the delay produced thereby, means responsive to the simultaneous occurrence of delayed and received pulses for limiting the peak amplitude of said recurrent waveform of sense corresponding to maximum delay, and means for deriving an output which is a function of the peak current in said cathode load impedance.

9. In a radio ranging system, a transmitter of time-spaced pulse signals, a superregenerative receiver of object-reflected transmitted pulses adapted to be unquenched in response to pulse signals supplied to it and having its sensitivity determined by the character of said pulses, a producer of other pulse signals timed with reference to said transmitter pulses but normally varying in duration and in the steepness of their trailing edges, means for differentiating said other pulses to yield delayed pulses whose timing is a function of the timing of said transmitter pulses and of the duration of said other pulses, and whose character is a function of the steepness of the trailing edges of said other pulses, means for applying said delayed pulses to said receiver to unquench it and to control its sensitivity, and means for deriving an output which is a function of the delay of a received pulse arriving simultaneously with the unquenching of said receiver with respect to the transmitter pulse of which it is the reflection.

10. In a radio ranging system, a transmitter of time-spaced pulse signals at a particular frequency, a receiver of object-reflected transmitted pulses, means for variably delaying pulses from said transmitter by time intervals proportional to the instantaneous amplitude of a sawtooth waveform of frequency lower than said transmitted signals whereby to effect a searching action of the pulses thus delayed with respect to received pulses reflected from objects at different ranges, means comprising a condenser and a gas discharge tube for generating said sawtooth waveform and for applying it to said delay means, means responsive to the simultaneous occurrence of delayed and received pulses for discharging said condenser by a predetermined amount whereby to terminate said searching action and to cause subsequent delayed pulses to occur simultaneously with received pulses from a given target object more frequently than would obtain as a result of said searching action, manually operable means for discharging said condenser to a potential corresponding to a predetermined minimum delay of said transmitter pulses, thereby to reinitiate searching for a target, and means for deriving an output which is a function of the peak amplitude of said sawtooth waveform.

11. In a radio ranging system, a transmitter of time-spaced pulse signals at a particular frequency, a receiver of object-reflected transmitted pulses, means for variably delaying pulses from said transmitter by time intervals proportional to the instantaneous amplitude of a sawtooth waveform of frequency lower than said transmitted signals whereby to effect a searching action of the pulses thus delayed with respect to received pulses reflected from objects at different ranges, means comprising a condenser and a gas discharge tube for generating said sawtooth waveform and for applying it to said delay means, means normally responsive to the simultaneous occurence of delayed and received pulses for discharging said condenser by a predetermined amount whereby to terminate said searching action and to cause subsequent delayed pulses to occur simultaneously with received pulses from a given target object more frequently than would obtain as a result of said searching action, manually operable means for rendering said last-named means non-responsive during intervals of predetermined duration, thereby to prevent termination of said searching action in response to the simultaneous occurrence of a delayed pulse and a reflected pulse received from a given target and to permit said searching to continue, and means for deriving an output which is a function of the peak amplitude of said sawtooth waveform.

12. In a radio ranging system, a transmitter of time-spaced pulse signals, a superregenerative receiver of object-reflected transmitted pulses adapted to be unquenched in response to pulse signals supplied to it and having its sensitivity determined by the character of said pulses, a producer of other time-spaced pulse signals normally delayed by varying time intervals with reference to said transmitter pulses and whose characters are a function of said delay, means for applying said other pulses to said receiver to unquench it and to control its sensitivity, and means for deriving an output which is a function of the delay of a received pulse arriving simultaneously with the unquenching of said receiver with respect to the transmitter pulse of which it is the reflection.

13. In a radio ranging system, a transmitter of time-spaced pulse signals, a receiver of object-reflected transmitted pulses, means including a source of a signal of recurrent waveform for producing other time-spaced pulse signals delayed with reference to said transmitted pulses, the delay of said other pulses being caused to vary progressively and recurrently in response to said signal of recurrent waveform, whereby to effect successive occurrences of said other pulses simultaneously with reflections of transmitted pulse signals received from targets at progressively different ranges, means responsive to the occurrence of received pulse signals simultaneously with said other pulses for modifying said recurrent waveform to alter the normal variation in the delay of said pulses with reference to said transmitted pulses by an amount sufficient to prevent a subsequent occurrence of one of said other pulses simultaneously with the arrival of a subsequent reflection from the same target object during a predetermined time interval and to permit such a simultaneous occurrence before it would take place in response to said normal variation in delay, and means for deriving an output which is a function of the delay between said transmitted pulses and said other pulses.

14. In a radio ranging system, a transmitter of time-spaced pulse signals, a receiver of object-reflected transmitted pulses, a producer of other time-spaced pulse signals variably delayed with reference to said transmitted pulses, a source of signal of recurrent waveform, means responsive to said signal of recurrent waveform for varying the delay of said other pulses with reference to said transmitted pulses as a function of the instantaneous magnitude of said recurrent waveform to effect successive occurrences of said other pulses simultaneously with reflections of transmitted pulse signals received from targets at different ranges, means responsive to the occurrence of received pulse signals simultaneously with said delayed pulses for modifying said recurrent waveform to alter the normal variation in the delay of said other pulses with reference to said transmitted pulses and thereby to effect a subsequent occurrence of a delayed pulse simultaneously with a subsequent reflection received from the same target object before such simultaneous occurrence would take place in response to the normal variation in delay of said other pulses in response to said recurrent waveform, and means for deriving an output which is a function of the delay between said transmitter pulses and said other pulses.

15. In a radio ranging system, a transmitter of time-spaced pulse signals, a producer of other pulse signals timed with reference to said transmitter pulses and variable in duration, means for differentiating said other pulses to produce delayed pulses whose timing is a function of the timing of said transmitter pulses and of the duration of said variable duration pulses, a receiver of object-reflected transmitted pulses, means for normally varying the duration of said variable duration pulses to effect variations in the timing of said delayed pulses with reference to said transmitter pulses to effect successive occurrences of said delayed pulses simultaneously with reflections of transmitted pulse signals received from targets at different ranges, means responsive to the occurrence of received pulse signals simultaneously with said delayed pulses to alter the normal variation in the duration of said variable duration pulses to effect a subsequent occurrence of a delayed pulse simultaneously with a subsequent reflection received from the same target object before such simultaneous occurrence would take place in response to said normal variation in the duration of said variable duration pulses, and means for deriving an output which is a function of the duration of said variable duration pulses.

16. In a radio ranging system, a transmitter of time-spaced pulse signals, a producer of other time-spaced pulse signals normally delayed by varying time intervals with interals with reference to said transmitter pulses, a receiver of object-reflected transmitted pulses, means responsive to the simultaneous occurrence of received and delayed pulses for substantially altering the delay of said delayed pulses with reference to said transmitter pulses, means for producing an output which is a function of the spacing between successive transmitter and producer pulses, means for normally rendering said last-named means inoperative to produce an output, and means responsive to the simultaneous occurrence of received and delayed pulses for rendering said output producing means operative.

17. A radio ranging system in accordance with claim 10, in which said manually operable means comprises a second condenser, means for maintaining said condenser normally charged to a predetermined potential, and manually operable means for connecting said condenser between the grid of said gas tube and a point of predetermined potential.

WILSON P. BOOTHROYD.
ALBERT L. FREE.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,171,148 | Percival | Aug. 29, 1939 |
| 2,211,942 | White | Aug. 20, 1940 |
| 2,227,057 | Blumlein | Dec. 31, 1940 |
| 2,266,516 | Russel | Dec. 16, 1941 |
| 2,361,437 | Trevor | Oct. 31, 1944 |
| 2,412,710 | Bradley | Dec. 17, 1946 |
| 2,414,992 | Wheeler | Jan. 28, 1947 |
| 2,421,018 | De Rosa | May 27, 1947 |
| 2,422,382 | Winchel | June 17, 1947 |
| 2,454,772 | Chatterjea et al. | Nov. 30, 1948 |